United States Patent
Peternel et al.

(10) Patent No.: US 9,256,039 B2
(45) Date of Patent: Feb. 9, 2016

(54) ELECTROMAGNETIC ISOLATING BALL SPRING

(71) Applicant: Cisco Technology, Inc., San Jose, CA (US)

(72) Inventors: Joyce J. M. Peternel, Morgan Hill, CA (US); Yong M. Jeon, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 104 days.

(21) Appl. No.: 13/734,128

(22) Filed: Jan. 4, 2013

(65) Prior Publication Data

US 2014/0193121 A1    Jul. 10, 2014

(51) Int. Cl.
*G02B 6/42*    (2006.01)

(52) U.S. Cl.
CPC ............ *G02B 6/4257* (2013.01); *G02B 6/4277* (2013.01); *G02B 6/4246* (2013.01); *Y10T 29/49002* (2015.01); *Y10T 29/4913* (2015.01); *Y10T 29/49826* (2015.01)

(58) Field of Classification Search
CPC ........... G02B 6/42; G02B 6/00; G02B 6/4257
USPC ..................................................... 385/89, 92
See application file for complete search history.

(56) References Cited

U.S. PATENT DOCUMENTS

| | | | |
|---|---|---|---|
| RE30,094 E * | 9/1979 | Beeck | 250/229 |
| 4,934,666 A * | 6/1990 | Balsells | 267/1.5 |
| 5,091,606 A * | 2/1992 | Balsells | 174/370 |
| 5,134,244 A * | 7/1992 | Balsells | 174/352 |
| 6,302,596 B1 | 10/2001 | Cohen et al. | |
| 6,335,869 B1 | 1/2002 | Branch et al. | |
| 6,659,655 B2 | 12/2003 | Dair et al. | |
| 6,744,639 B1 * | 6/2004 | Branch et al. | 361/818 |
| 6,953,289 B2 | 10/2005 | Togami et al. | |
| 2003/0156802 A1 | 8/2003 | Togami et al. | |
| 2008/0145006 A1* | 6/2008 | Ice | 385/93 |
| 2010/0092131 A1 | 4/2010 | Davidson et al. | |
| 2014/0131932 A1* | 5/2014 | Balsells et al. | 267/167 |

FOREIGN PATENT DOCUMENTS

WO    2004014113 A2    2/2004

OTHER PUBLICATIONS

International Search Report and Written Opinion in counterpart International Application No. PCT/US2013/076515, mailed Apr. 22, 2014, 10 pages.

* cited by examiner

*Primary Examiner* — Kaveh Kianni
(74) *Attorney, Agent, or Firm* — Edell, Shapiro & Finnan, LLC

(57) ABSTRACT

A device including a port barrel, a ball spring, a first enclosure part, and a mounting plate disposed adjacent to the first enclosure part is disclosed. The mounting plate includes a mounting hole. The port barrel is arranged to extend through the mounting hole, and the ball spring is arranged between an inner surface of the mounting hole and an exterior surface of the port barrel.

23 Claims, 19 Drawing Sheets

US 9,256,039 B2

ELECTROMAGNETIC ISOLATING BALL SPRING

TECHNICAL FIELD

The present disclosure relates to electromagnetic isolation of electronics from electromagnetic signals.

BACKGROUND

Optical transceiver modules are used to send and receive signals across optical networks. The modules need to be robust enough to handle large forces during their assembly, as well as during their service lives. For example, the modules need to be able to have optical cables inserted and removed throughout their service lives without seeing degradation in signal quality.

Additionally, in order to provide adequate electromagnetic isolation (EMI) of the electronics contained in the modules, and to prevent electrostatic discharge, sufficient enclosure and grounding of the module components is necessary. As data rates of optical networks increase, acceptable levels of EMI and electrostatic discharge (ESD) decrease, requiring modules manufactured to increasingly tighter tolerances.

DESCRIPTION OF EXAMPLE EMBODIMENTS

Overview

A device including a port barrel, a ball spring, a first enclosure part, and a mounting plate disposed adjacent to the first enclosure part is disclosed. The mounting plate includes a mounting hole. The port barrel is arranged to extend through the mounting hole, and the ball spring is arranged between an inner surface of the mounting hole and an exterior surface of the port barrel.

A method of assembling a module includes extending a port barrel through a mounting hole of a mounting plate, wherein the mounting plate is disposed adjacent to a first enclosure part. A ball spring is arranged between an inner surface of the mounting hole and an exterior surface of the port barrel. A second enclosure part is placed in sealing contact with the first enclosure part such that the port barrel is at least partially enclosed by the first enclosure part and the second enclosure part.

Example Embodiments

Figure 1:
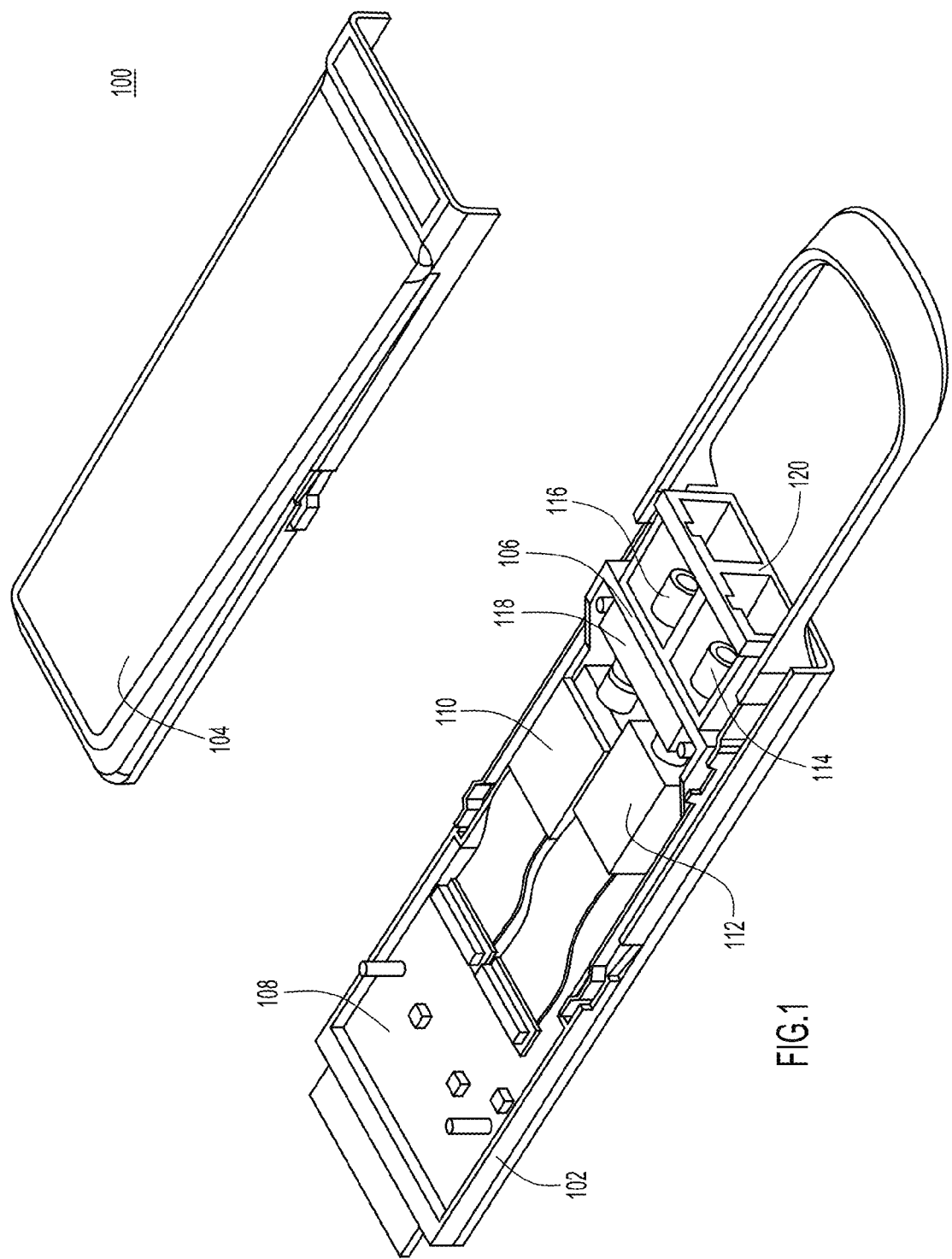
FIG. 1 illustrates an example transceiver module providing electromagnetic isolation.

Depicted in FIG. 1 is an input/output module, in this case a transceiver module 100. Module 100 is comprised of a first enclosure part 102, a second enclosure part 104, and a mounting plate 106. The first enclosure part 102, the second enclosure part 104, and the mounting plate 106 provide electromagnetic isolation (EMI) to printed circuit board 108, transceiver optical sub-assembly (TOSA) 112 and receiver optical sub-assembly (ROSA) 110. Input/output interfaces, in this case optical port barrels 114 and 116, provide output for TOSA 112, and input for ROSA 110, respectively. Port barrels 114 and 116 pass through and are supported in port mounting holes (not shown) formed in mounting plate 106. Clips 118 and 120 maintain correct positioning and provide support for port barrels 114 and 116. Clip 120 also serves as a connector cage to allow external connections to the port barrels 114 and 116. For example, clip 120 may serve as a subscriber connector cage to allow optical cables to connect to port barrels 114 and 116.

Figure 2:
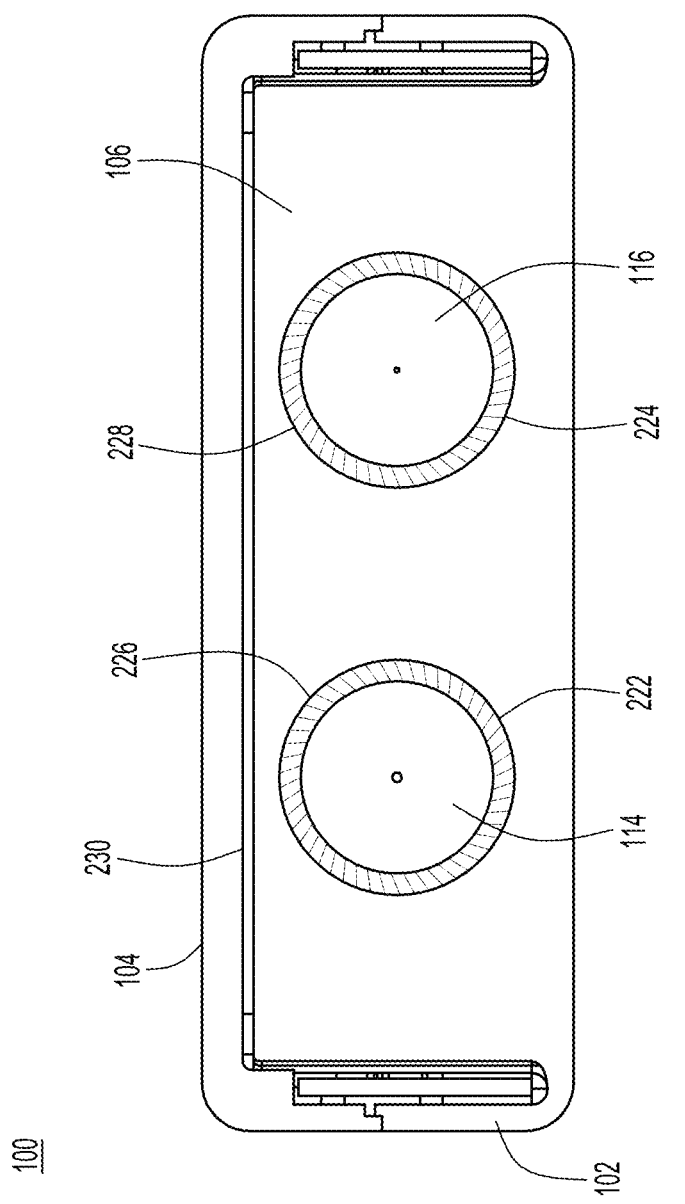
FIG. 2 illustrates a mounting plate for mounting module port barrels while providing electromagnetic isolation.

With reference now made to FIG. 2, illustrated therein is a front view of the module 100 from which the second clip 120 has been removed to provide a view of mounting plate 106. Mounting plate 106 provides a rigid structure in which port barrels 114 and 116 are supported. Accordingly, mounting plate 106 is integrally formed with first enclosure part 102. For example, mounting plate 106 may be die cast with first enclosure part 102 as a single part. Similarly, mounting plate 106 may be integrally formed with second enclosure part 104, or otherwise rigidly mounted to either first enclosure part 102 or second enclosure part 104.

Formed in mounting plate 106 are mounting holes 222 and 224 through which port barrels 114 and 116 extend, respectively. As depicted in FIG. 2, mounting holes 222 and 224 are formed in a single mounting plate 106. By using a single mounting plate 106, EMI benefits may be achieved over other designs. For example, in a design in which multiple mounting plates are used, the seams or spaces between the multiple plates need to be accounted for when providing for EMI shielding. For example, in a "clam shell" design in which half of each mounting hole is formed in a different plate, EMI shielding considerations may include providing adequate shielding for the seams between the two plates, providing adequate shielding at the transitions between the seams and the mounting hole portions of the plate, and designing manufacturing and assembly processes which arrange the plates together to adequate tolerances. When a single plate is used, many of these considerations may be eliminated.

Supporting port barrels 114 and 116 in mounting holes 222 and 224 are ball springs 226 and 228. A ball spring, such as ball springs 226 and 228, is an annular shaped spring in which a piece of metal wire is bent into a circular helical shape. An example ball spring 226 is more clearly show in FIG. 12. Accordingly, by supporting port barrels 114 and 116 in mounting holes 222 and 224 with ball springs 226 and 228, ball springs 226 and 228 prevent electromagnetic leakage that would otherwise be present due to gaps between the port barrels 114 and 116 and mounting holes 222 and 224.

Ball springs 226 and 228 may provide improved EMI shielding over other methods, such as the use of shielding gaskets, metallic fabrics and meshes, silver epoxy and/or other metal filled shielding materials. For example, when shielding gaskets and/or metallic fabrics are used, stresses placed on module elements, such as port barrels, may be transferred to the shielding material, thereby causing the gaskets or fabrics to deform. Due to the ductile nature of gaskets and metallic fabrics, when the stresses are removed the shielding material may not return to its original shape or position. Accordingly, the deformation of the shielding material may open gaps in the spaces the gaskets and/or metallic fabrics were attempting to fill. Additionally, gaskets and metal fabrics are easily improperly placed during assembly, leading to apertures or gaps that may result in ESI or ESD failures. Furthermore, silver epoxy cannot be designed and manufactured to specific sizes and tolerances, and therefore using it as a shielding material requires great care and oversight during assembly of modules. Silver epoxy is also expensive, requires the addition of curing processes to the assembly process, and is simply messy and difficult to work with during assembly, disassembly and repair of modules.

In contrast, ball springs 226 and 228 flex during the installation process, flex when placed under stress, and will return to their original shape when the stresses are removed due to the elastic nature of a ball spring. Additionally, ball springs may be manufactured to precise tolerances. For example, ball springs 226 and 228 can be manufactured to match or expand to the size of mounting holes 222 and 224. Accordingly, during assembly when shielding materials such as silver epoxy are difficult to control and accurately place, ball springs 226 and 228 are easily and accurately placed, allowing for simpler or automated assembly of modules. Ball springs 226 and 228 provide additional benefits during the assembly process. For example, the forces used to insert ball springs 226 and 228 may provide a "wiping force" removing unwanted oxides from the port barrels 112 and 114. Furthermore, due to the metallic structure and circular shape of ball springs, ball springs 226 and 228 can provide reliable ground contact all the way around optical port barrels 114 and 116. In other words, unlike gaskets and metallic fabrics, ball springs 226 and 228 are held in a slightly compressed state allowing for metal to metal contact that will help improve EMI containment and grounding of metallic port barrels 114 and 116, respectively.

In addition to the EMI benefits, optical performance benefits may also be achieved through the use of ball springs 226 and 228. While in use, port barrels 114 and 116 may be acted on by an excessive force transverse to the optical axis from the fiber optical cable that can result in an offset of the optical axis relative to the optical axis of port barrels 114 and 116, and lead to degraded optical coupling performance. Specifically, in an optical network implementation, optical fibers may be connected to ROSA/TOSA modules through port barrels 116 and 114. Either intentionally or inadvertently, the optical fibers may place forces or stresses on the port barrels, and in turn, on the ROSA/TOSA assemblies. For example, if an optical fiber cable is placed in tension, and in a transverse direction to the optical port axis, a transverse force may be transferred to the port barrel to which the optical fiber is currently connected. Depending on how the port barrels are mounted, stresses placed on the port barrels may result in deformations between the port barrels and the ROSA/TOSA assemblies to which they are connected. As the port barrels and ROSA/TOSA assemblies are built to extremely high optical tolerances, even small forces may cause alignment problems which will manifest as data errors in the signals sent through the optical cables. Yet, due to the elastic nature of ball springs 226 and 228, stresses placed on port barrels 114 and 116 may be transferred to ball springs 226 and 228, flexing the ball springs 226 and 228 instead of deforming the port barrels 114 and 116, the interfaces between the port barrels and the ROSA/TOSA assemblies, or the ROSA/TOSA assemblies themselves, thereby reducing angular axial offsets and data errors. Furthermore, ball springs 226 and 228, as a result of their circular structure, provide 360 degrees of ground contact.

Also depicted in FIG. 2 is EMI shielding 230 which prevents E-M EMI leakage in the space between the mounting plate 106 and the second enclosure part 104.

Figure 3:
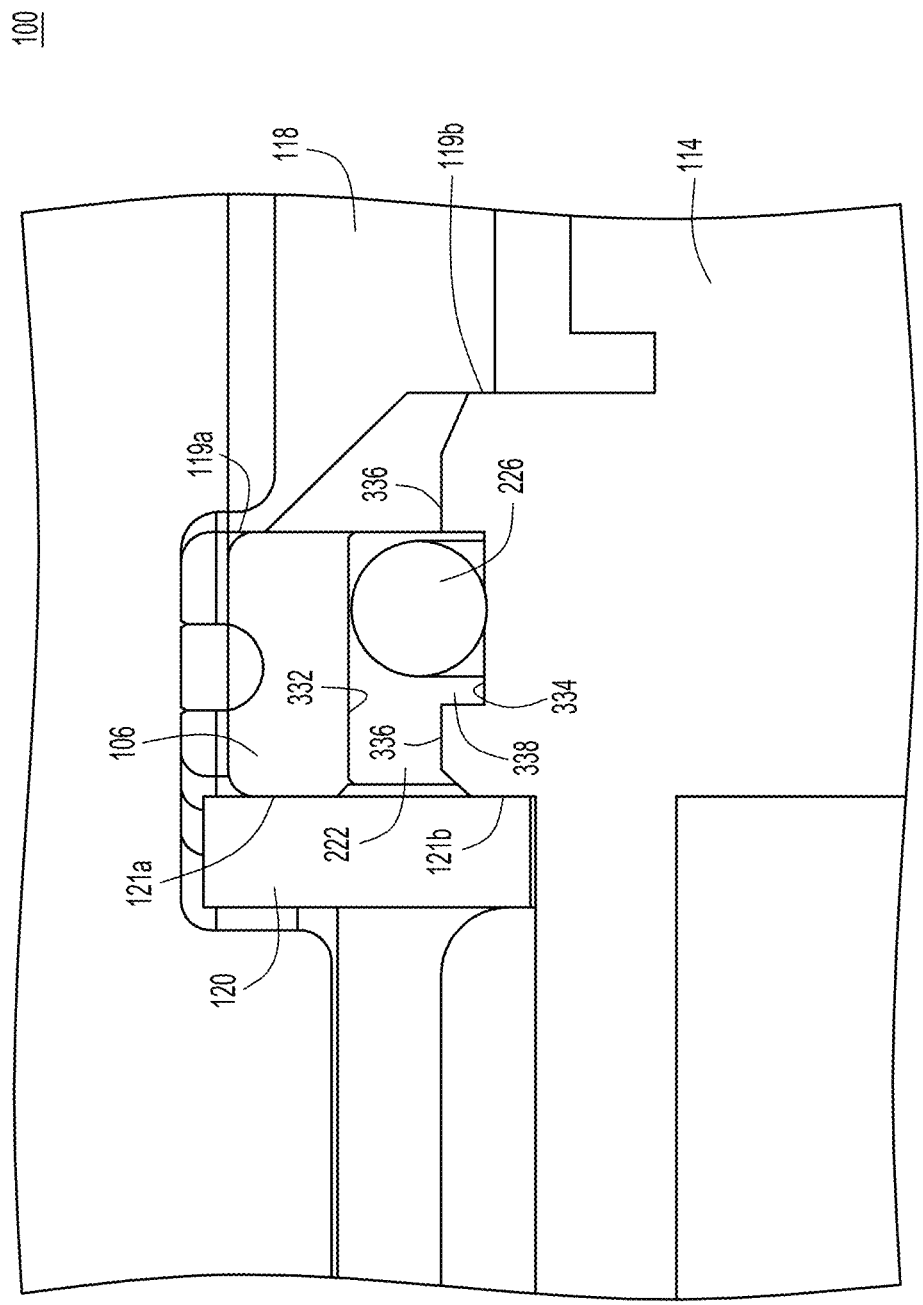
FIG. 3 is a cross-sectional view of a first example mounting plate with a ball spring providing electromagnetic isolation.

With reference now made to FIG. 3, depicted is a cross-sectional view of mounting plate 106, mounting hole 222, ball spring 226, port barrel 114, first clip 118 and second clip 120 which illustrates how the port barrel 114 may be supported in port mounting hole 222 by ball spring 226. Specifically, ball spring 226 is located between an inner wall 332 of mounting hole 222 and an outer wall 334 of port barrel 114. As depicted in FIG. 3, port barrel 114 is supported by ball spring 226 in mounting hole 222, and is not directly supported by the walls of mounting hole 222. Accordingly, port barrel 114 is able to "float" within mounting hole 222 depending on the amount of compression that ball spring 226 undergoes. Therefore, when forces are applied to port barrel 114, the forces may result in the compression or deformation of ball spring 226, and not in deformation of port barrel 114 or any electrical components connected to port barrel 114.

Port barrel 114 also includes double flange 336. Double flange 336 is integrally formed with port barrel 114, and provides structure to keep ball spring 226 radially aligned with the direction that mounting plate 106 extends from the first enclosure part (not depicted). In other words, the ball spring 226 is arranged such that a radius of the ball spring is substantially parallel to the direction in which mounting plate 106 extends. Specifically, ball spring 226 is seated within the interior 338 of double flange 336, thereby ensuring that ball spring 226 remains situated between an interior wall 332 of mounting hole 222 and exterior wall 334 of port barrel 114.

First clip 118 and second clip 120 ensure that ball spring 226 remains within mounting hole 222 and also maintain the axial position of the port barrel 114 relative to mounting plate 106. In other words, clips 118 and 120 prevent port barrel 114 from moving axially. As depicted in FIG. 3, a first portion 119a of first clip 118 is made flush with an axially facing wall of mounting plate 106 while a second portion 119b is made flush with an exterior axially facing wall of second flange 336. Accordingly, port barrel 114 is prevented from moving axially in the direction of first clip 118. Similarly, a first portion 121a of second clip 120 is made flush with an axially facing wall of mounting plate 106 while a second portion 121b of second clip 120 is made flush with an exterior axially facing wall of second flange 336, thereby preventing port barrel 114 from moving axially in the direction of second clip 120. Furthermore, first clip 118 and second clip 120 enclose ball spring 226 between the inner surface of the port mounting hole 222, the interior of the double flange 336, the first clip 118 and the second clip 120, thereby ensuring that ball spring 226 remains confined to port mounting hole 222.

Figure 4:
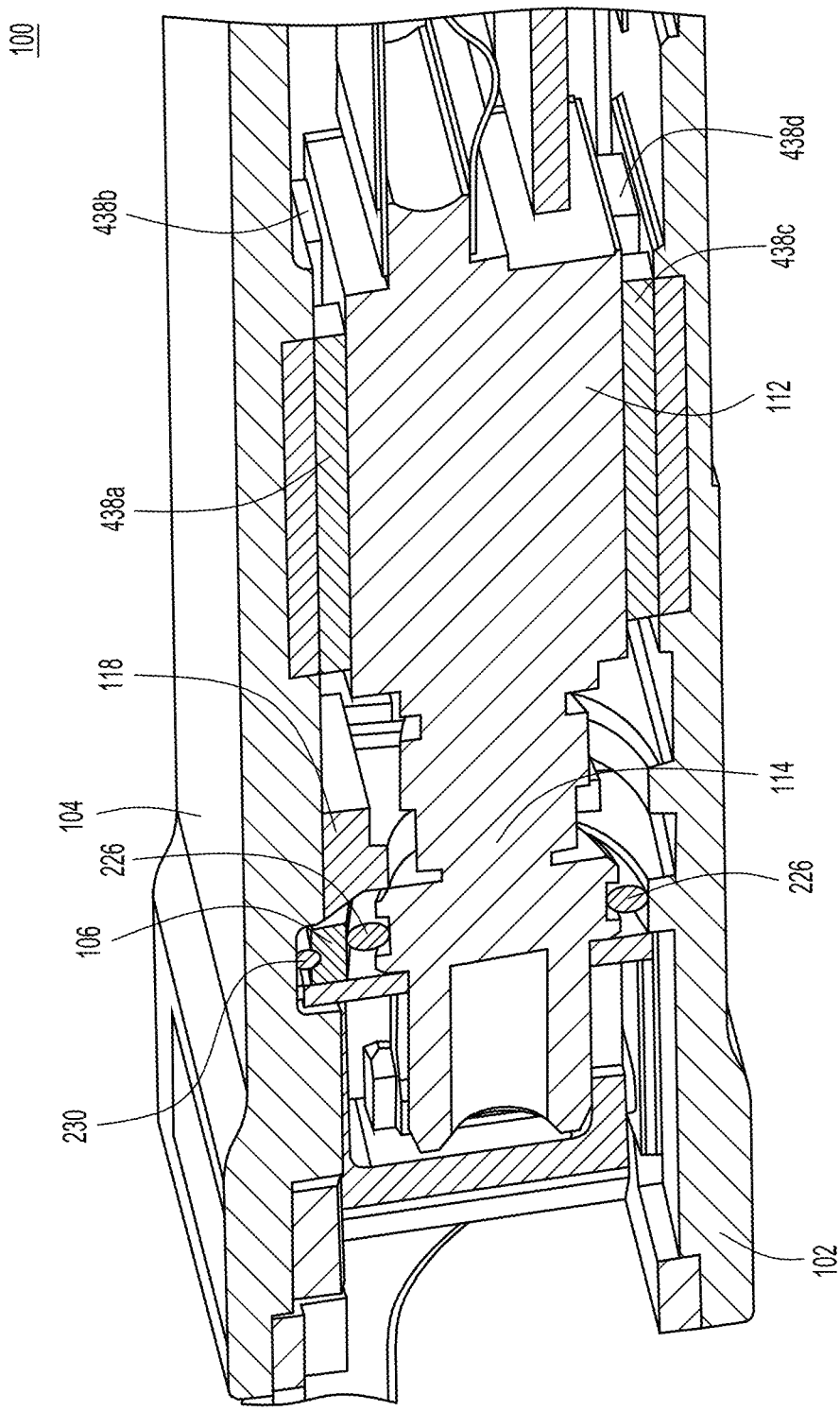
FIG. 4 is a perspective view of a transceiver module providing electromagnetic isolation of its electrical components.

Turning to FIG. 4, depicted therein is a cut-away, perspective view of a module 100 illustrating the ability of port barrel 114 to float within mounting hole 222. As can be seen in FIG. 4, first clip 118 prevents port barrel 114 from moving axial, but does not prevent vertical movement as it does not provide vertical support for port barrel 114. Instead, ball spring 226 supports port barrel 114 in port mounting hole 222. Furthermore, second clip 120 also provides for movement of port barrel 114 in the vertical direction as indicated by the space between the bottom of second clip 120 and first enclosure part 102. Accordingly, if port barrel 114 is pulled in a vertical direction, the compression or deformation of ball spring 226 absorbs the force, and allows port barrel 114 to travel in the vertical direction.

Additionally, TOSA 112 is supported between first enclosure part 102 and second enclosure part 104 through pliable supports 438a-d. Pliable supports 438a-b allow the TOSA assembly to travel with port barrel 114, preventing tension and deformation where port barrel 114 meets TOSA 112. Analogous techniques may be used to allow a ROSA, such as ROSA 110 of FIG. 1, to travel with a port barrel, such as port barrel 116 also of FIG. 1. Furthermore, pliable supports 438a-c may be embodied in thermal pads, providing the additional benefit of thermal transfer of excess heat from the ROSA/TOSA assemblies to the enclosure parts.

Figure 5:
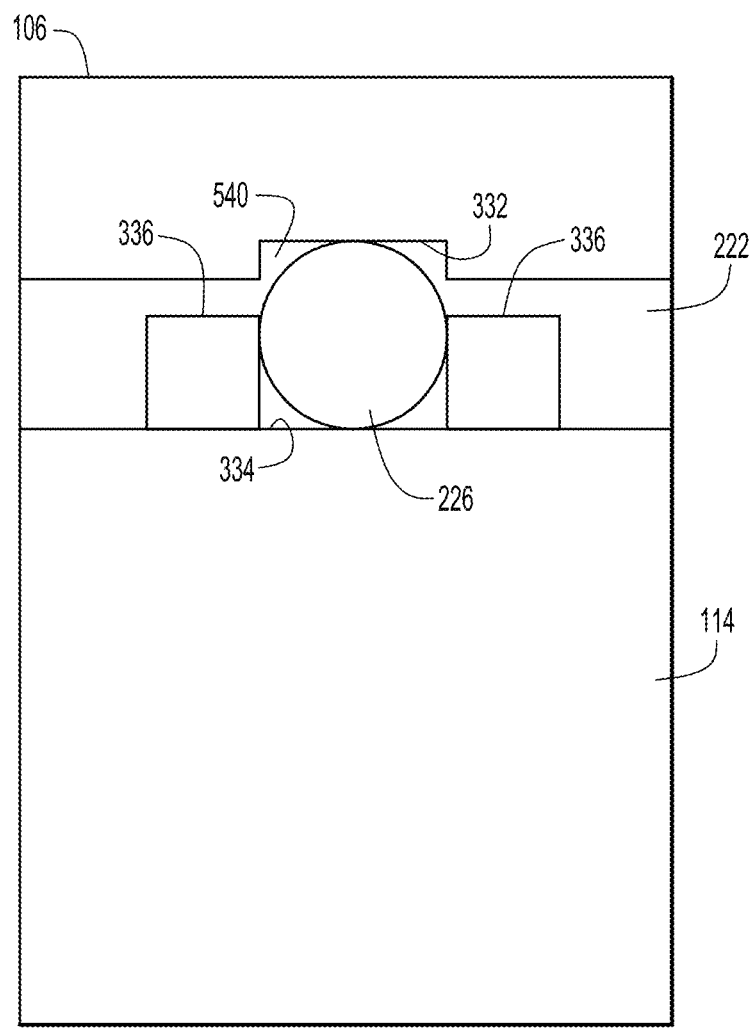
FIG. 5 is a cross-sectional view of a second example mounting plate with a ball spring providing electromagnetic isolation.

With reference now made to FIG. 5, depicted therein is a cross-section view of an additional example module 500 similar to module 100 of FIGS. 1-4. Accordingly, like reference numerals have been used to describe like components and features. In module 500, ball spring 226 remains located between an interior wall 332 of mounting hole 222 and the interior of double flange 336 of port barrel 114. Though, in module 500, the portion of the interior wall 332 against which ball spring 226 is located is within groove 540. The inclusion of groove 540 provides additional axial support for ball spring 226. For example, not only does double flange 336 prevent ball spring 226 from escaping mounting hole 222, but the axially facing walls of groove 540 further prevent ball spring 226 from escaping mounting hole 222.

Figure 6:
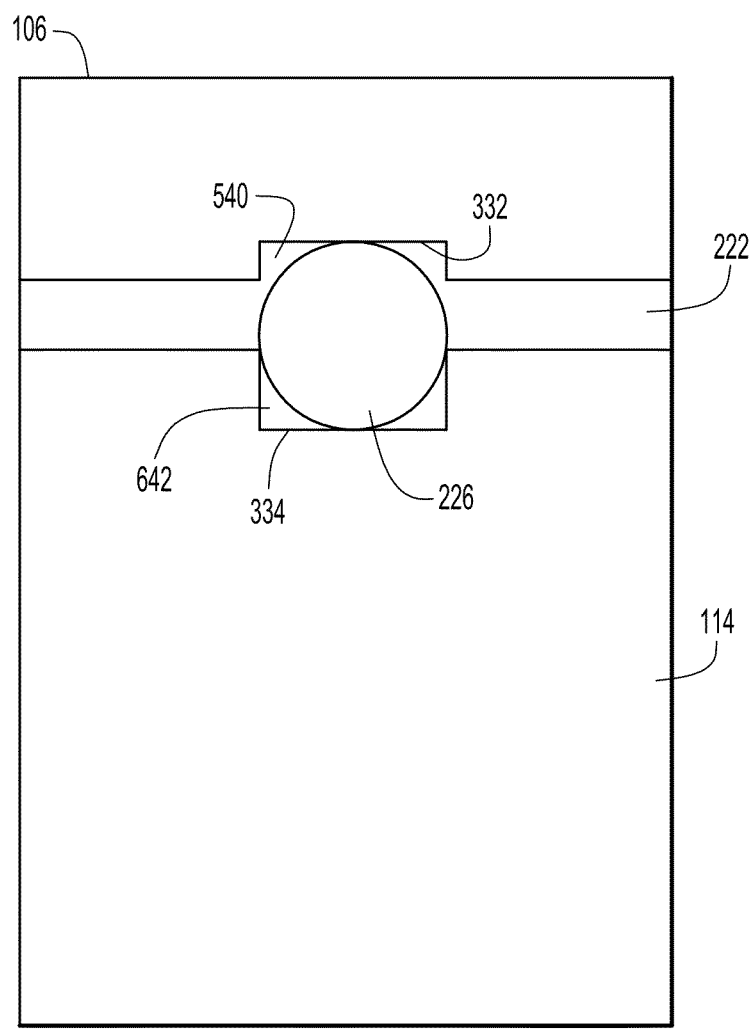
FIG. 6 is cross-sectional view of a third example mounting plate with a ball spring providing electromagnetic isolation.

Turning to FIG. 6, depicted therein is another example module 600 in which the double flange of modules 100 and 500 has been replaced with a second groove 642. Accordingly, ball spring 226 is arranged in an interior of first groove 540 and an interior of second groove 642. While replacing the double flange of FIGS. 3-5 with second groove 642 may result in a more easily manufactured port barrel 114, the first clip 118 and second clip 120 of FIGS. 3 and 5 may need to be modified or replaced to prevent port barrel 114 from moving in an axial direction.

Figure 7:
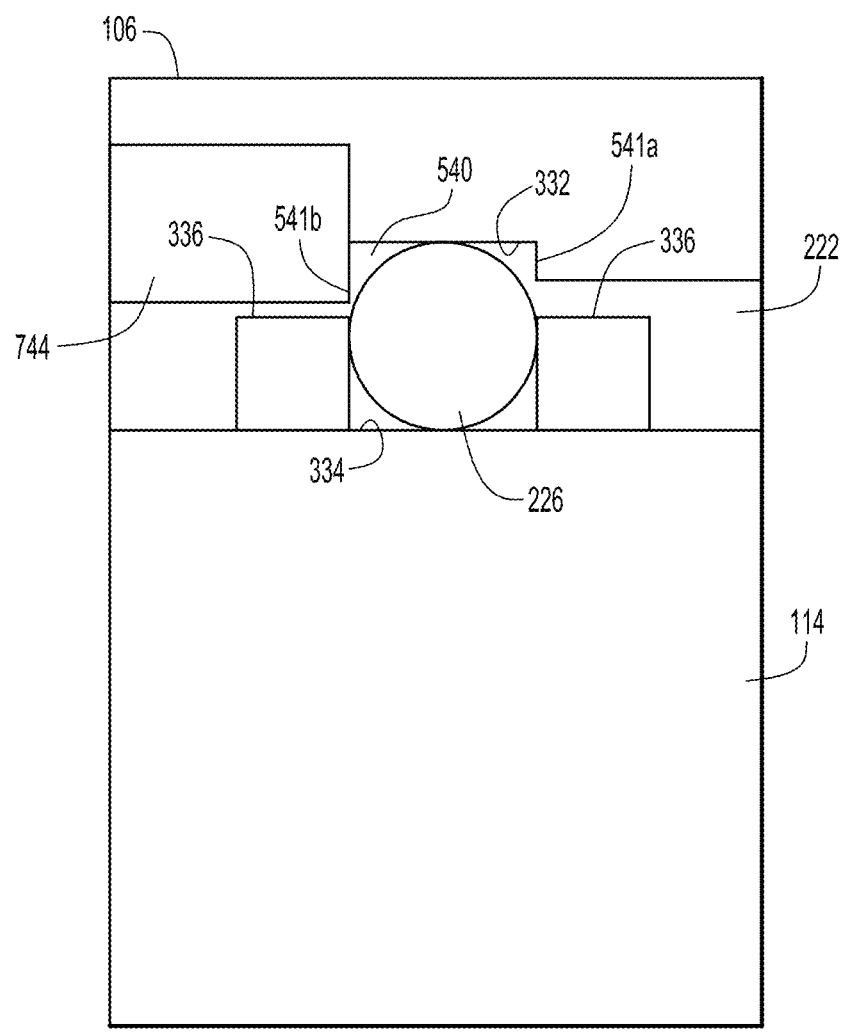
FIG. 7 is a cross-sectional view of a fourth example mounting plate with a ball spring providing electromagnetic isolation.

With reference now made to FIG. 7, depicted therein is yet another example module 700. The ball spring 226 of module 700 is arranged within the interior of double flange 336 of port barrel 114 and the interior of groove 540. A first axially facing wall 541a of groove 540 is integrally formed with mounting plate 106 while a second axially facing wall 541b is formed by third clip 541b. Accordingly, during assembly, the ball spring may be arranged within the interior of double flange 336 and the interior of groove 540 prior to the placement of third clip 744, easing the assembly process. Once ball spring 226 is arranged correctly, third clip 744 is added, ensuring that ball spring 226 remains within the interior of groove 540. According to other examples, the second axially facing wall 541b of groove 540 may be provided by clips similar to first clip 118 and second clip 120 of FIGS. 3 and 4.

Figure 8:
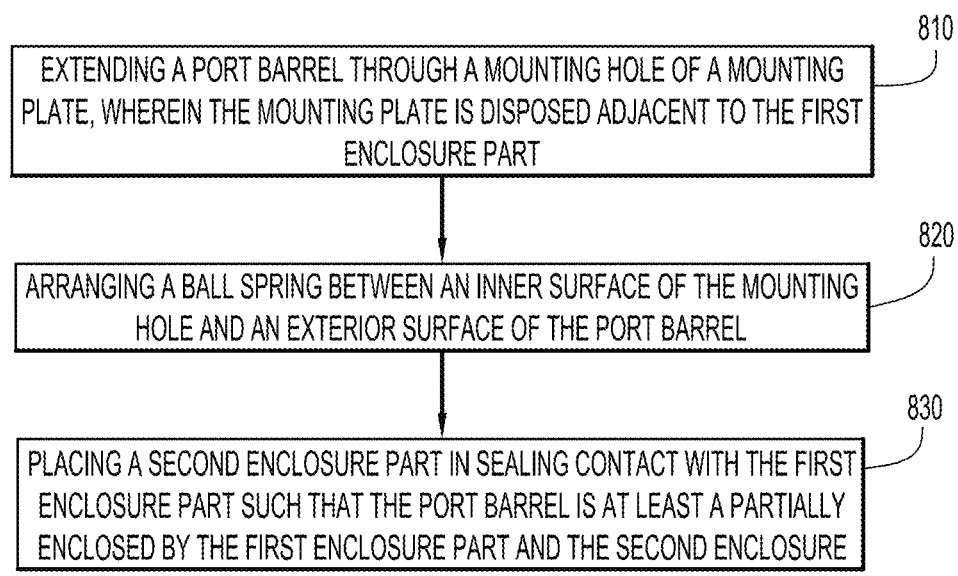
FIG. 8 is a flowchart illustrating an example process for assembling a transceiver module.
Figure 9:
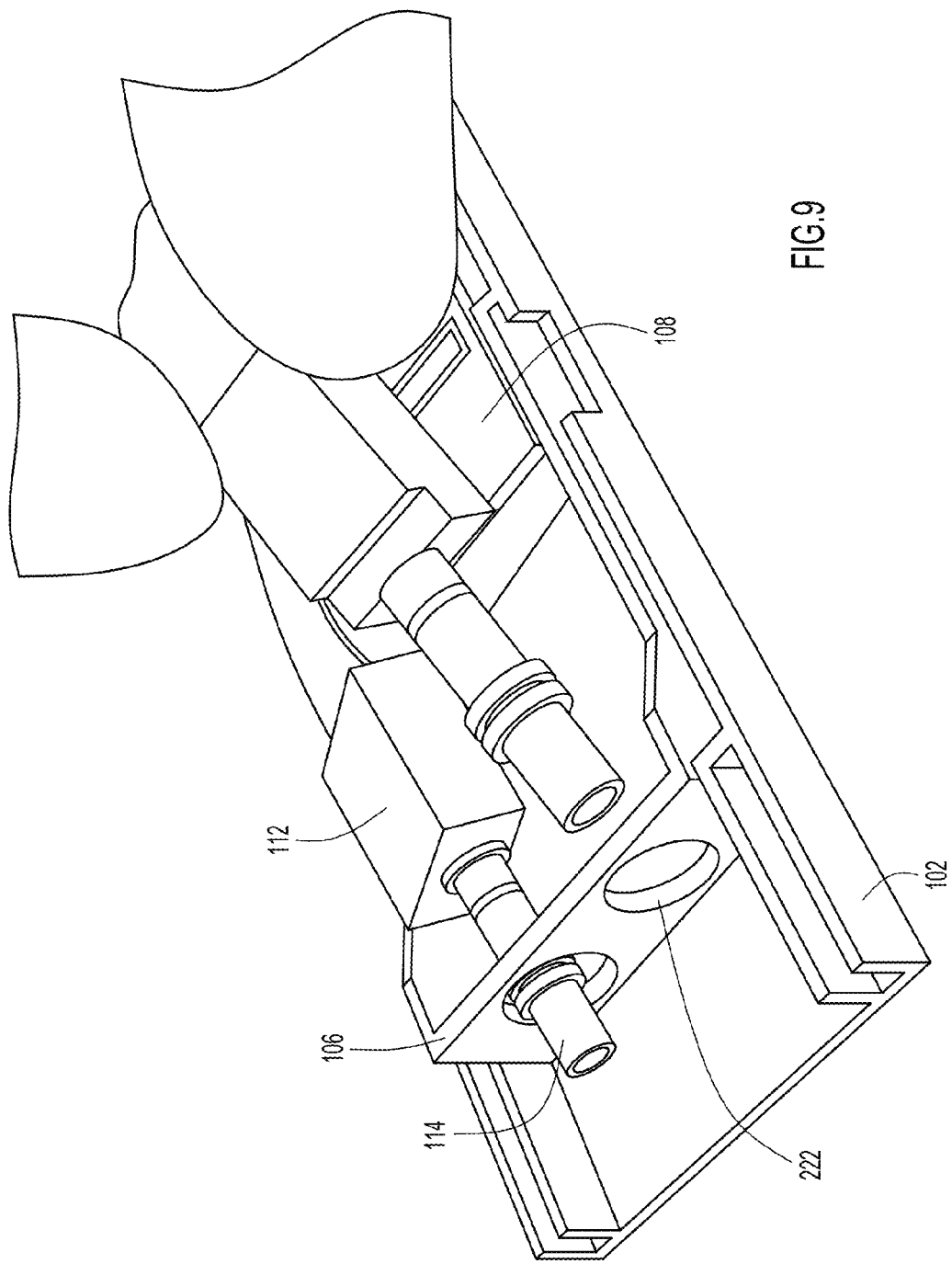
FIGS. 9-18 illustrate a transceiver module assembly operation.

Turning now to FIG. 8, depicted therein is a flow chart 800 illustrating a method for assembling a module, such as module 100 of FIG. 1. The process begins in step 810 where a port barrel is extended through a mounting hole of a mounting plate. The mounting plate is disposed adjacent to a first enclosure part. For example, the mounting plate may extend in a direction normal to an inside surface of the first enclosure part, such as mounting plate 106 and first enclosure part 102 of FIG. 1.

In step 820 a ball spring is arranged between an inner surface of the mounting hole and an exterior surface of the port barrel. Furthermore, according to additional examples, the exterior surface of the port barrel may be a portion of the port barrel that is in the interior of the mounting hole or a double flange, such as double flange 336 of FIG. 3.

Finally, in step 830, a second enclosure part is placed in sealing contact with the first enclosure part such that the port barrel is at least partially enclosed by the first enclosure part and the second enclosure part. According to specific examples, the portion of a port barrel connected to a ROSA or TOSA assembly may be enclosed by the first enclosure part, the second enclosure part, and the mounting plate, while a portion of the port barrel configured to connect to an optical fiber can be accessed through an opening in the first and second enclosure parts.

Referring now to FIGS. 9-18, depicted therein is a specific example of a process used to assemble a module such as module 100 of FIG. 1. The process begins in FIG. 9, where printed circuit board 108 is arranged on first enclosure part 102, and port barrel 114 of the TOSA assembly 112 is extended through port mounting hole 222 of mounting plate 106. The printed circuit board 108 may be arranged on thermal pads which have been previously arranged on first enclosure part 102.

Figure 10:
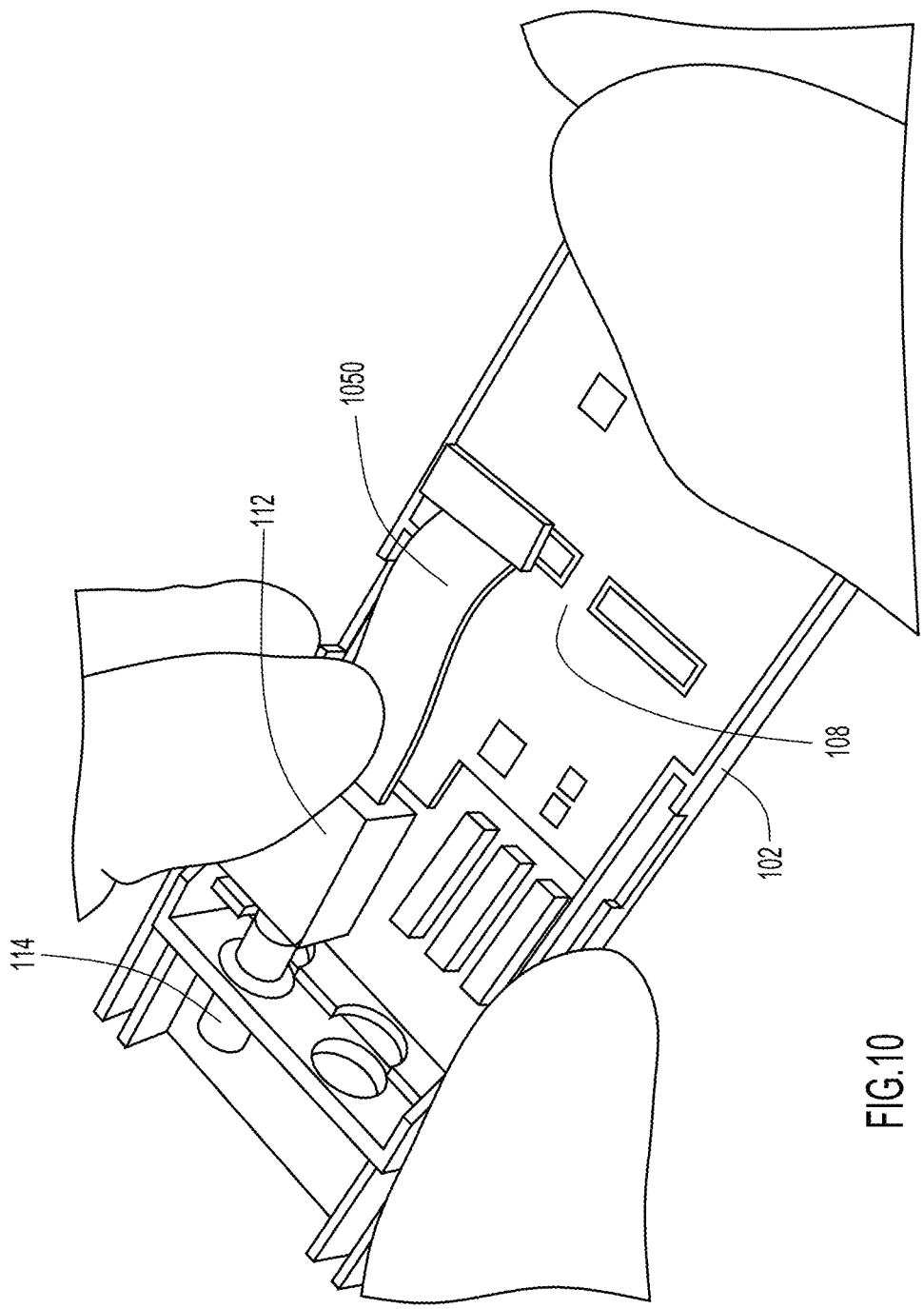

As depicted in FIG. 10, TOSA assembly 112 is electrically connected to printed circuit board 108 through radio frequency (RF) flex 1050.

Figure 11:
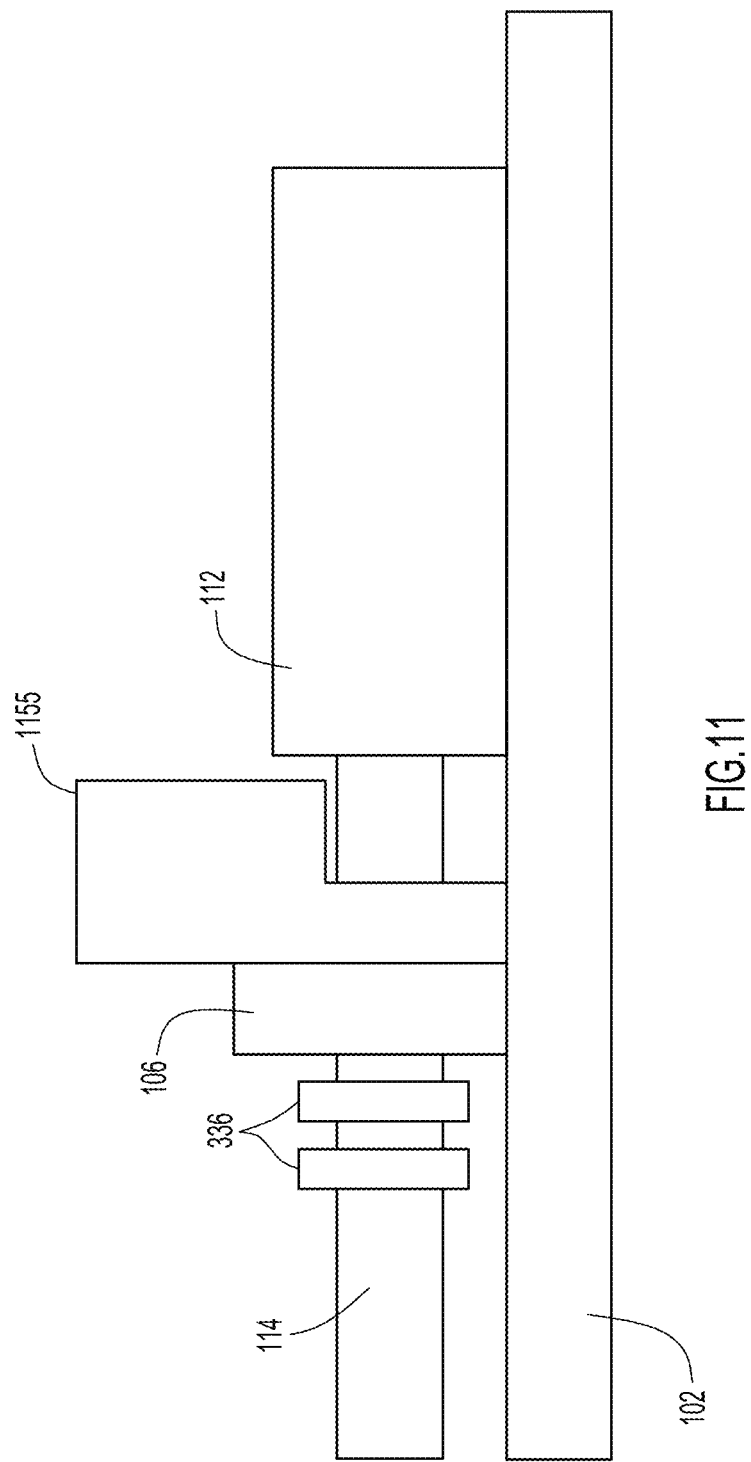

In FIG. 11, a first assembly tool 1155 is arranged on the TOSA assembly side of mounting plate 106, and extends port barrel 114 through mounting hole 222 of mounting plate 106 far enough that double flange 336 extends past the opposite outer axially facing wall of mounting plate 106. According to other examples, port barrel 114 need only be extended far enough for ball spring 226 to be placed within the interior of double flange 336. For example, port barrel 114 need only be extended far enough that the interior of double flange 336 extends past the opposite outer axially facing wall of mounting plate 106, with a portion of double flange 336 remaining in mounting hole 222.

Figure 12:
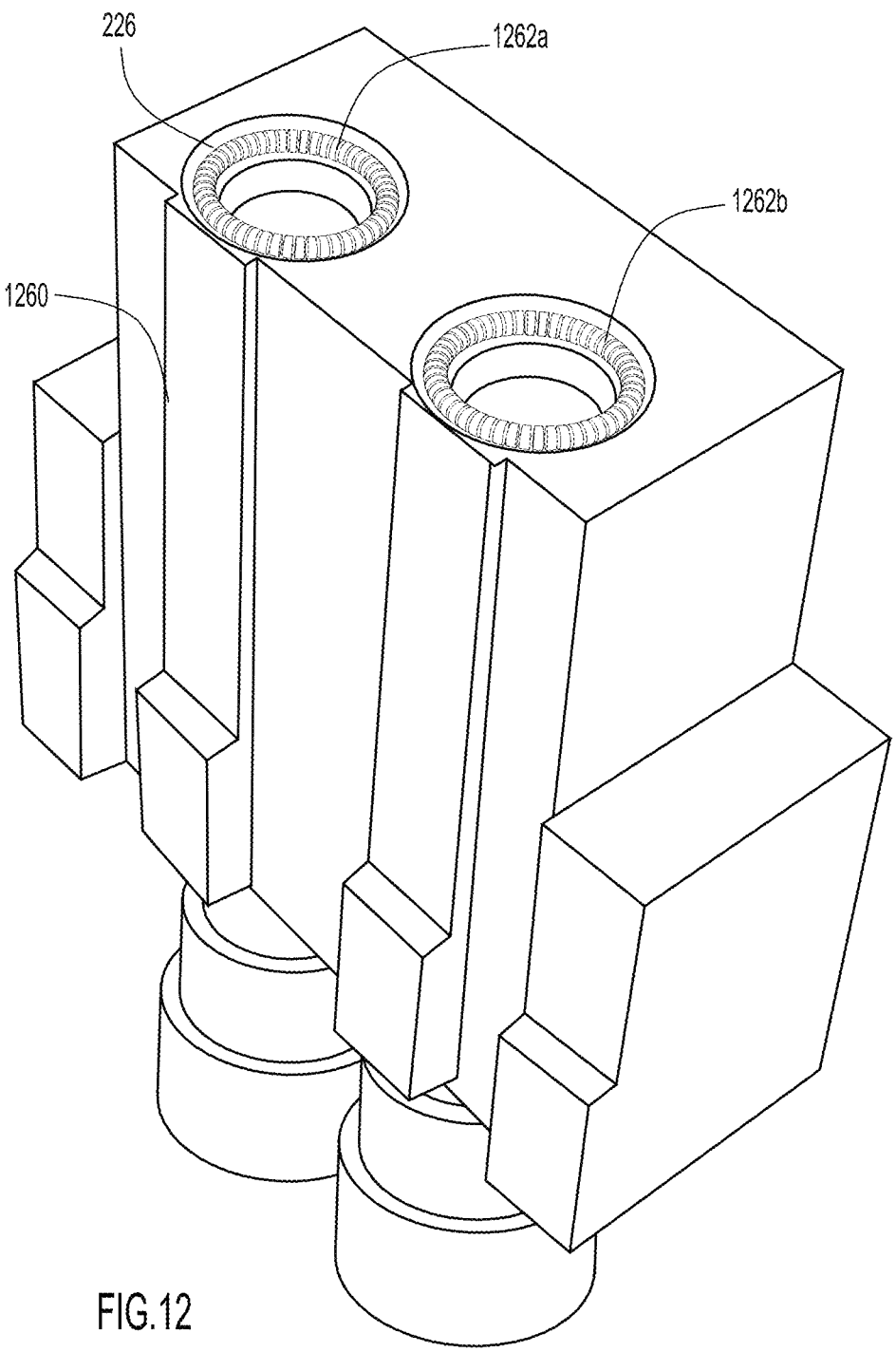

In FIG. 12, ball spring 226 is loaded into second assembly tool 1260. Ball spring 226 is loaded into one of holes 1262a-b which will be used to seat the ball spring 226 in the double flange 336 of port barrel 114. For a module which includes both ROSA and TOSA assemblies, two holes 1262a and 1262b may be present in second assembly tool 1260 in order to mount ball springs over the port barrel for each sub-assembly.

Figure 13:
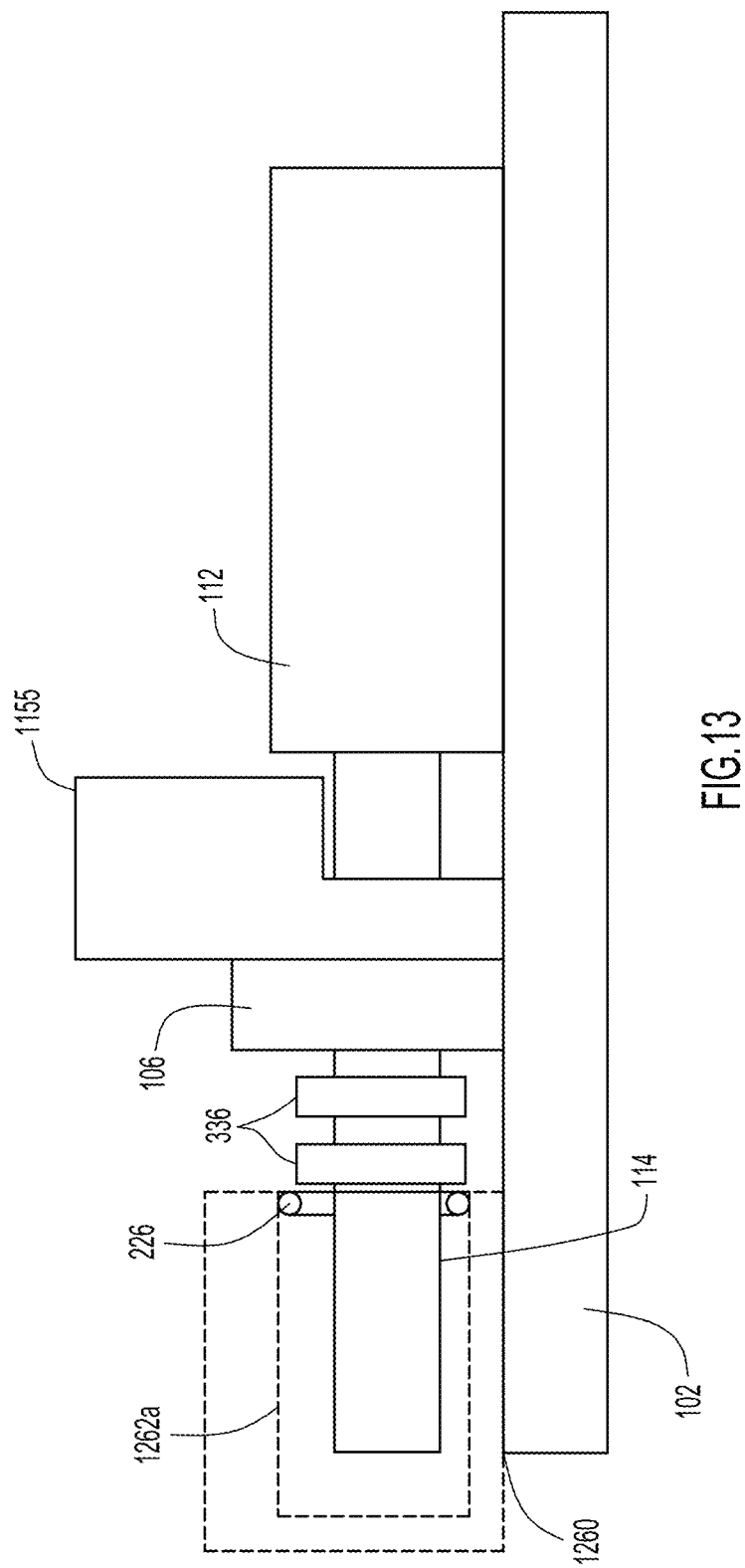
Figure 14:
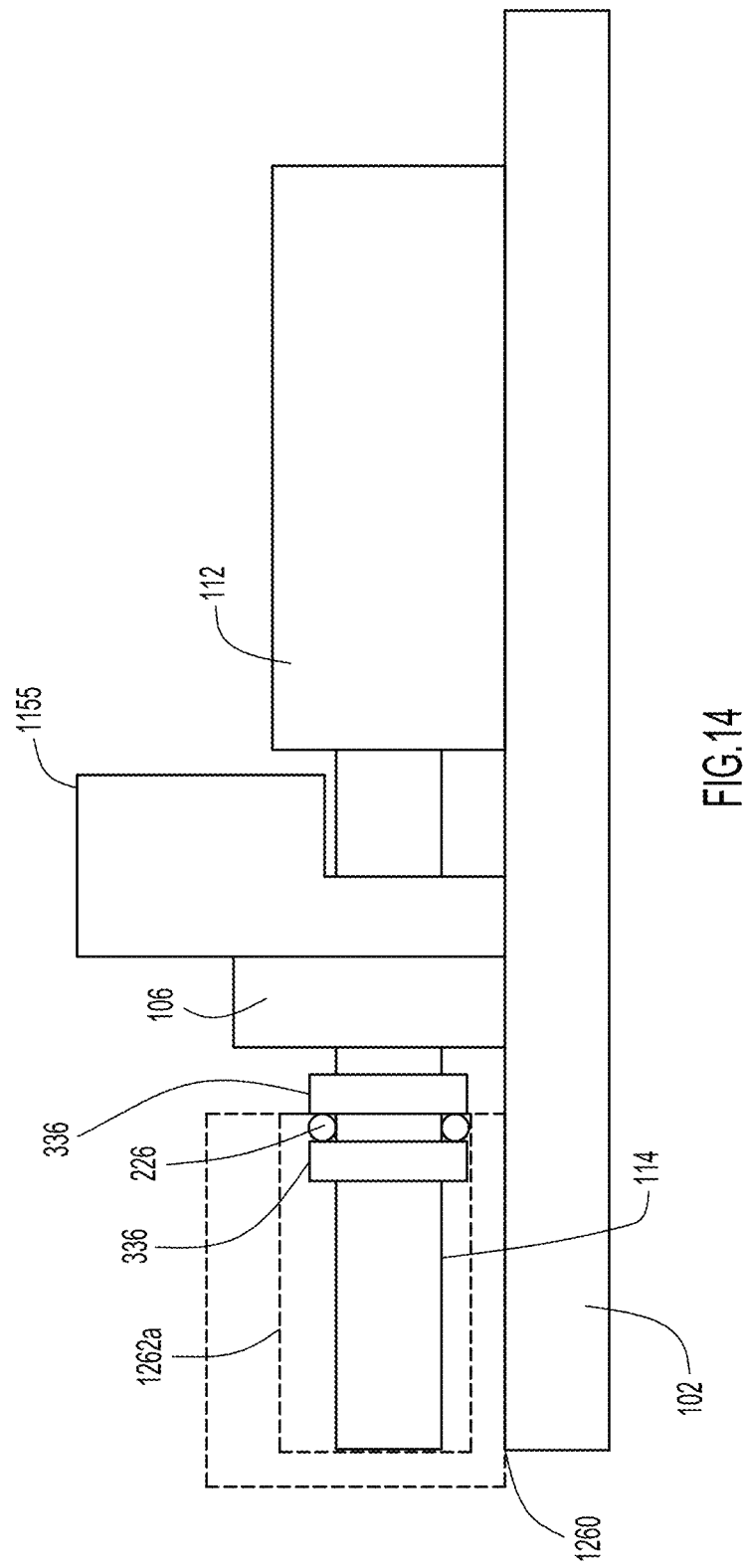

As illustrated in FIG. 13, hole 1262a is aligned with port barrel 114 to prepare to mount ball spring 226 over double flange 336. While in FIG. 14, ball spring 226 is seated in double flange 336. Second assembly tool 1260 may include parts which expand ball spring 226 so that it fits easily over double flange 336. According to other examples, second assembly tool 1260 simply pushes ball spring 226 over double flange 336 to seat the ball spring 226 in the interior of double flange 336. In other examples, a combination of expanding ball spring 226 and pressing ball spring 226 are used to seat ball spring 226 in the interior of double flange 336.

Figure 15:
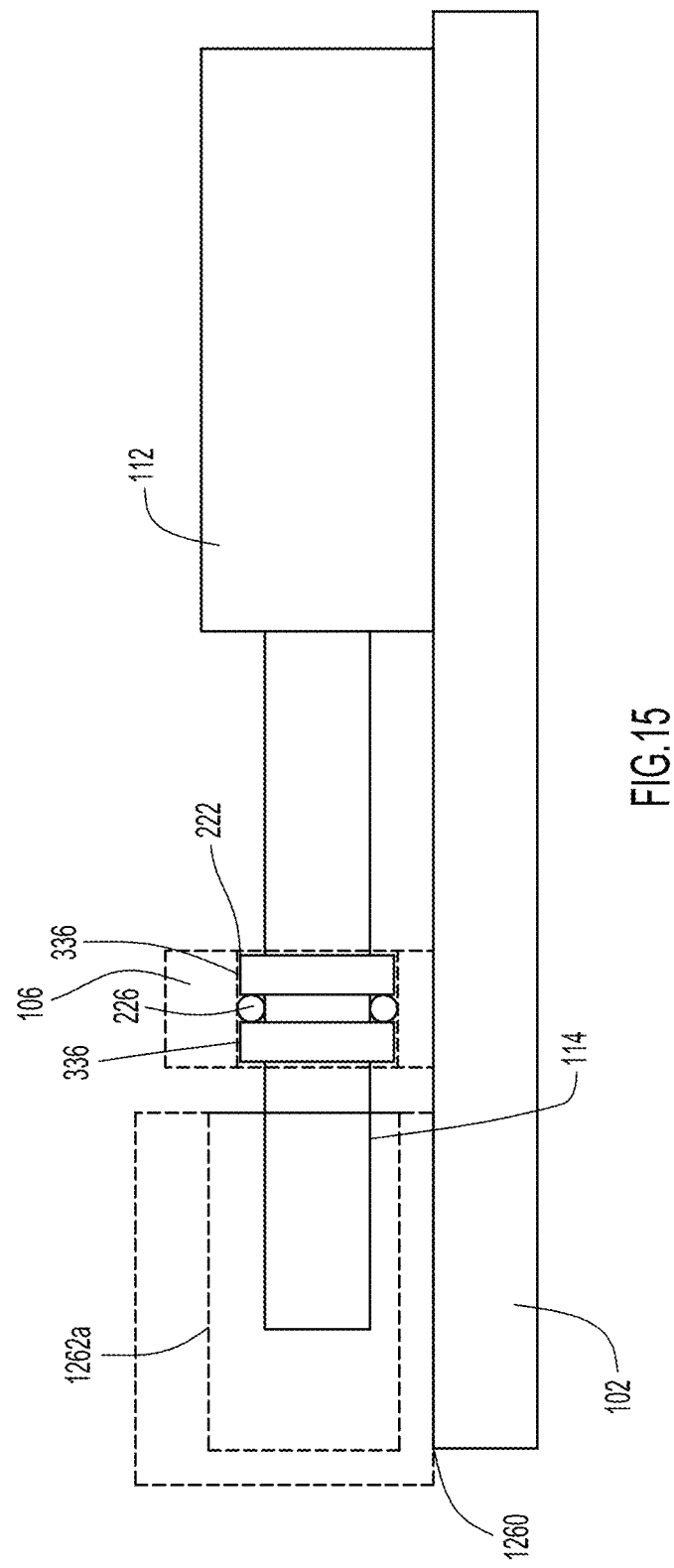
Figure 16:
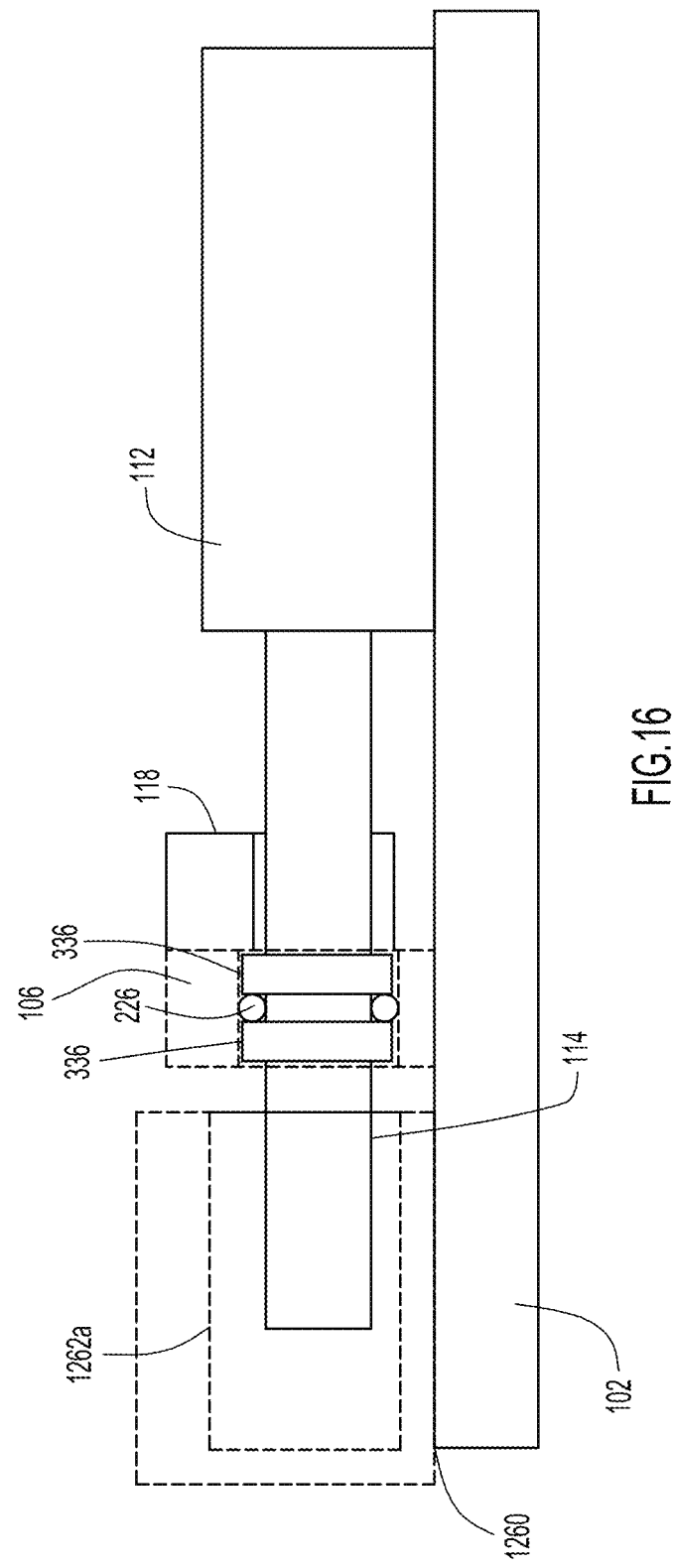
Figure 17:
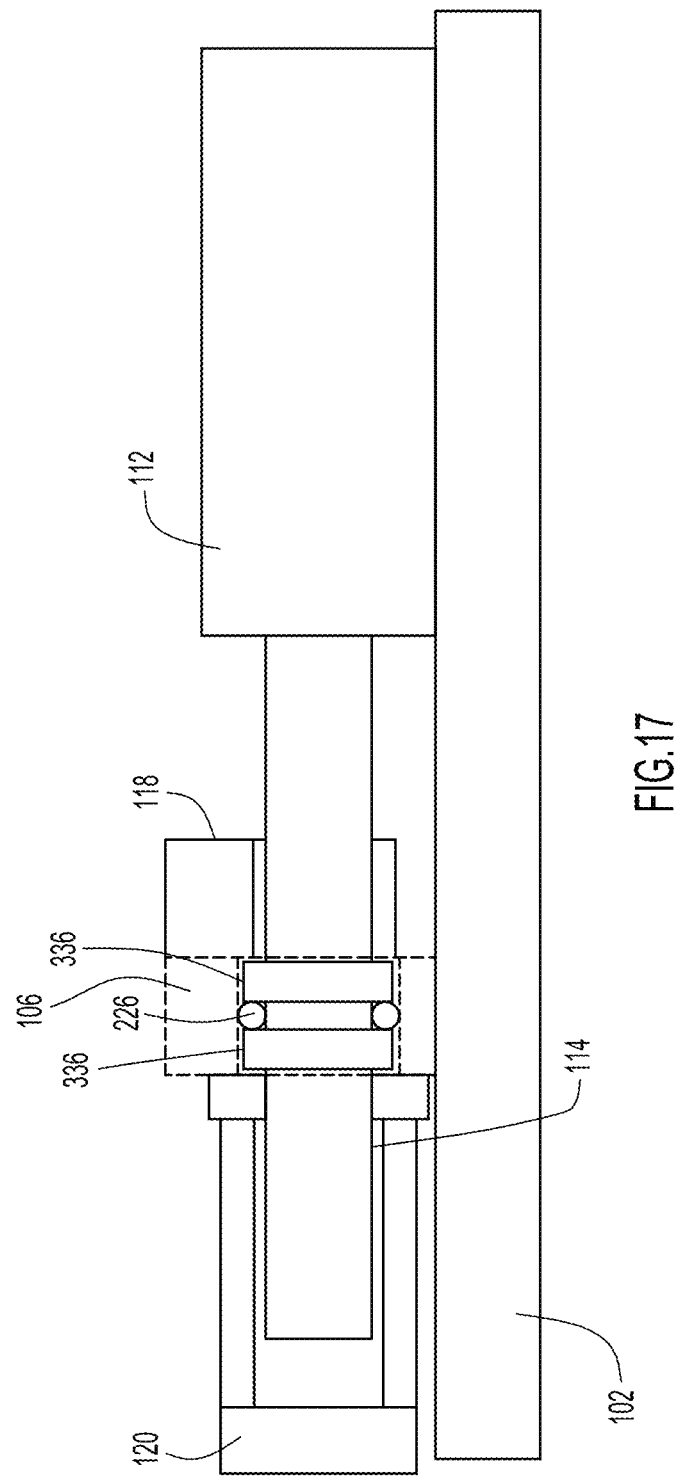
Figure 18:
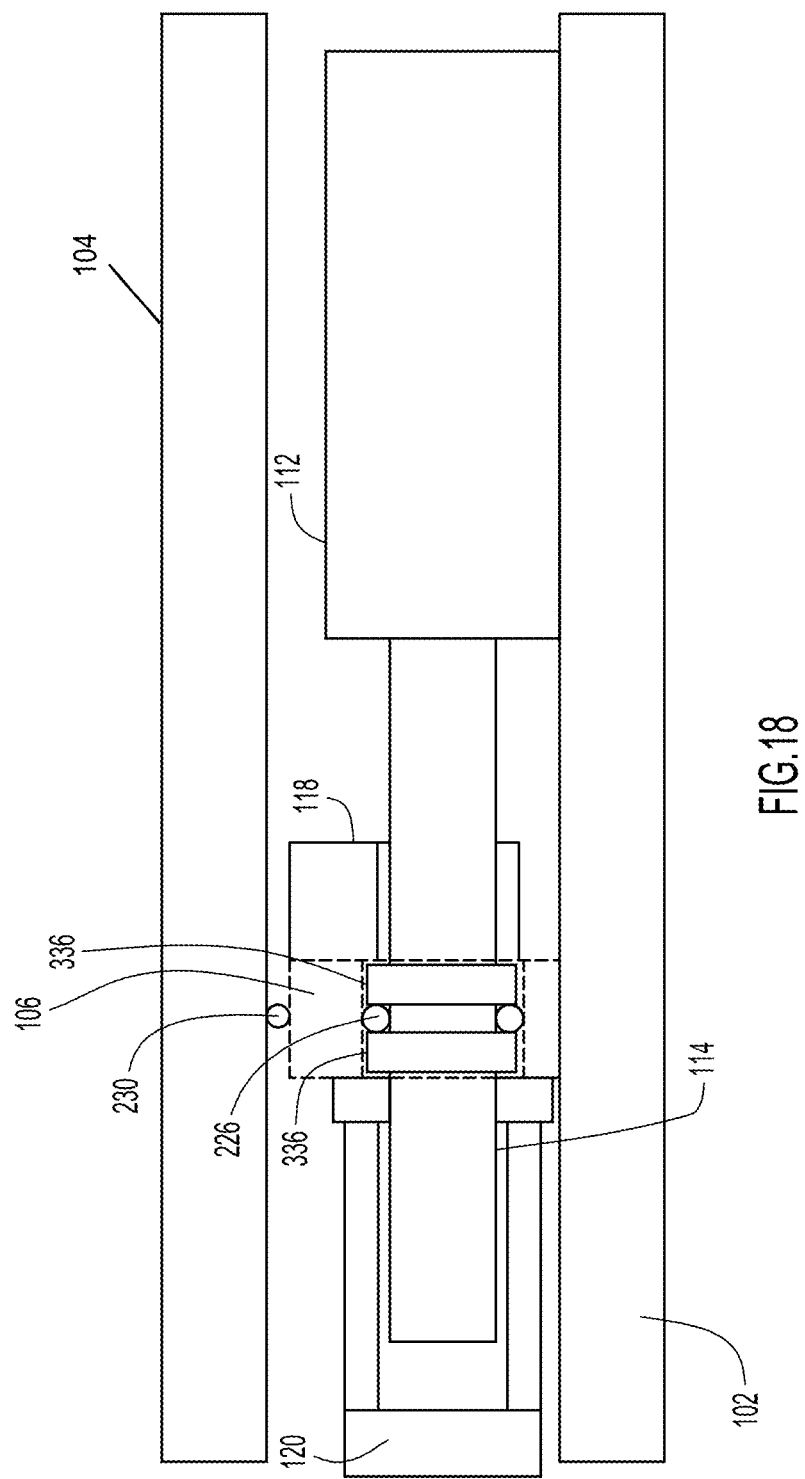

As illustrated in FIG. 15 first assembly tool 1155 is removed allowing port barrel 114 to move back through mounting plate 106 so that ball spring 226 is arranged between an interior wall of mounting hole 222 and exterior wall of port barrel 114 while remaining seated in the interior of double flange 336. First clip 118 is then arranged to prevent port barrel 114 from moving in an axial direction opposite the second assembly tool 1260, as illustrated in FIG. 16. Next, as illustrated in FIG. 17, second assembly tool 1260 is removed, and second clip 120 is arranged on the side opposite first clip 118 to prevent port barrel 114 from moving in the axial direction opposite the first clip 118. Finally, as illustrated in FIG. 18, second enclosure part 104 is placed in sealing contact with first enclosure part 102 and mounting plate 106. Placing second enclosure part 104 in sealing contact with first enclosure part may include placing additional E-M shielding 230 between the top of mounting plate 106 and the inside surface of second enclosure part 104.

Figure 19:
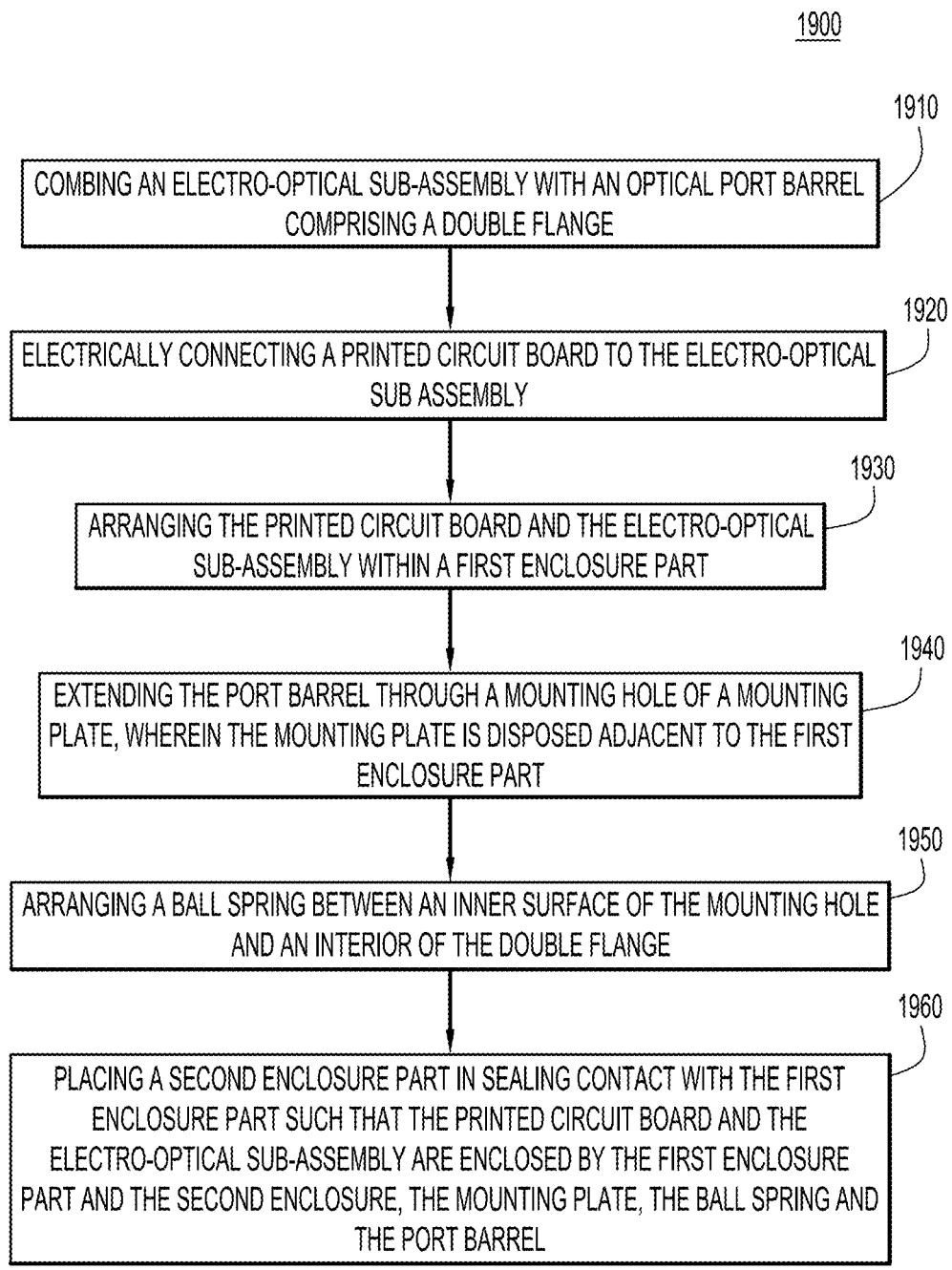
FIG. 19 is a flow chart illustrating an example method of providing electromagnetic isolation.

With reference now made to FIG. 19, depicted therein is a flowchart 1900 of a process of providing EMI shielding for a module such as module 100 of FIG. 1. Specifically, the process provides electromagnetic isolation for an electro-optical sub-assembly and a printed circuit board. The electro-optical sub-assembly may be a ROSA or a TOSA, such as ROSA 110 and TOSA 112 of FIG. 1. The process begins in step 1910 where an electro-optical sub-assembly is combined with an optical port barrel. The optical port barrel will include a double flange, for example, double flange 336 of FIG. 3. In step 1920, a printed circuit board is electrically connected to the electro-optical sub-assembly. In step 1930 the electro-optical sub-assembly and the printed circuit board are arranged within a first enclosure part.

In step 1940 the port barrel is extended through a mounting hole of a mounting plate, where the mounting plate is disposed adjacent to the first enclosure part. For example, the mounting plate may extend in a direction normal to an inside surface of the first enclosure part, such as mounting plate 106 and first enclosure part 102 of FIG. 1.

In step 1950, a ball spring is arranged between an inner surface of the mounting hole and an interior of the double flange. Finally, in step 1960, a second enclosure part is placed in sealing contact with the first enclosure part such that the printed circuit board and the electro-optical sub-assembly are enclosed by the first enclosure part, the second enclosure part, the mounting plate, the ball spring and the port barrel.

The above description is intended by way of example only.

What is claimed is:

1. An apparatus comprising:
   a first port barrel
   a first ball spring;
   a second port barrel;
   a second ball spring,
   a first enclosure part;
   a second enclosure part, and
   a mounting plate disposed adjacent to the first enclosure part and comprising a first mounting hole and a second mounting hole,
   wherein:
   the first port barrel is arranged extending through the first mounting hole,
   the first ball spring is arranged between an inner surface of the first mounting hole and an exterior surface of the first port barrel,
   the second port barrel is arranged extending through the second mounting hole,
   the second ball spring is arranged between an inner surface of the second mounting hole and an exterior surface of the second port barrel, and
   the mounting plate extends from the first enclosure part in a direction normal to a surface of the first enclosure part, and the mounting plate is integrally formed with the first enclosure part and in sealing contact with the second enclosure part.

2. The apparatus of claim 1, wherein:
   the first port barrel comprises a double flange, and
   the first ball spring is arranged in an interior of the double flange.

3. The apparatus of claim 2, wherein:
   the second port barrel comprises a second double flange, and
   the second ball spring is arranged in an interior of the second double flange.

4. The apparatus of claim 1, wherein the first ball spring is arranged such that a radius of the first ball spring is substantially parallel to the direction in which the mounting plate extends.

5. The apparatus of claim 1, wherein the first port barrel comprises an optical port for at least one of a receiver optical sub-assembly or a transmitter optical sub-assembly.

6. The apparatus of claim 5, further comprising:
   a printed circuit board electrically connected to at least one of the receiver optical sub-assembly or the transmitter optical sub-assembly,
   wherein the first enclosure part and the second enclosure part enclose at least a portion of the printed circuit board, the first port barrel, and at least one of the receiver optical sub-assembly or the transmitter optical sub-assembly.

7. The apparatus of claim 1, wherein the first ball spring supports the first port barrel in the mounting hole.

8. The apparatus of claim 1 further comprising:
   a first clip contacting the mounting plate on a first side of the mounting plate; and
   a second clip contacting the mounting plate on a second side of the mounting plate,
   wherein the first clip and the second clip maintain the axial position of the first port barrel relative to the mounting plate.

9. The apparatus of claim 8 wherein the second clip comprises a connector cage.

10. The apparatus of claim 1, wherein the first port barrel comprises an optical port of a receiver optical sub-assembly and the second port barrel comprises an optical port of a transmitter optical sub-assembly.

11. The apparatus of claim 1, wherein the first ball spring elastically deforms to allow the first port barrel to travel in a direction perpendicular to the direction in which the first port barrel extends.

12. An apparatus comprising:
    a port barrel
    a ball spring;
    a first enclosure part; and
    a mounting plate disposed adjacent to the first enclosure part and comprising a mounting hole,
    wherein the port barrel is arranged extending through the mounting hole,
    wherein the ball spring is arranged between an inner surface of the mounting hole and an exterior surface of the port barrel,
    wherein the ball spring elastically deforms to allow the port barrel to travel in a direction perpendicular to the direction in which the port barrel extends,
    wherein the port barrel comprises a double flange,
    wherein the ball spring is arranged in an interior of the double flange, and
    wherein the ball spring in arranged between a first grove in the mounting hole and a second groove within the double flange in the port barrel.

13. The apparatus of claim 12, wherein the port barrel comprises an optical port for at least one of a receiver optical sub-assembly or a transmitter optical sub-assembly.

14. The apparatus of claim 12 further comprising:
    a first clip contacting the mounting plate on a first side of the mounting plate; and a second clip contacting the mounting plate on a second side of the mounting plate, wherein the first clip and the second clip maintain the axial position of the port barrel relative to the mounting plate.

15. The apparatus of claim 12, wherein the ball spring elastically deforms to allow the port barrel to travel in a direction perpendicular to the direction in which the port barrel extends.

16. The apparatus of claim 12, further comprising:
a second port barrel; and
a second ball spring,
wherein:
the mounting plate comprises a second mounting hole;
the second port barrel is arranged extending through the second mounting hole; and
the second ball spring is arranged between an inner surface of the second mounting hole and an exterior surface of the second port barrel.

17. An apparatus comprising:
a port barrel
a ball spring;
a first enclosure part; and
a mounting plate disposed adjacent to the first enclosure part and comprising a mounting hole,
an optical sub-assembly connected to the first enclosure part through a first pliable support, and further connected to the port barrel,
wherein the port barrel is arranged extending through the mounting hole,
wherein the ball spring is arranged between an inner surface of the mounting hole and an exterior surface of the port barrel,
wherein the ball spring elastically deforms to allow the port barrel to travel in a direction perpendicular to the direction in which the port barrel extends, and
wherein the first pliable support deforms to allow the optical sub-assembly to travel in the direction perpendicular to the direction in which the port barrel extends with the port barrel.

18. The apparatus of claim 17, wherein the first pliable support provides thermal transfer from the optical sub-assembly to the first enclosure part.

19. The apparatus of claim 17 further comprising:
a second enclosure part, and
a second pliable support connecting the optical sub-assembly to the second enclosure part.

20. The apparatus of claim 17, wherein:
the port barrel comprises a double flange, and
the ball spring is arranged in an interior of the double flange.

21. The apparatus of claim 17, wherein the ball spring is arranged such that a radius of the ball spring is substantially parallel to the direction in which the mounting plate extends.

22. The apparatus of claim 17, wherein the port barrel comprises an optical port for at least one of a receiver optical sub-assembly or a transmitter optical sub-assembly.

23. The apparatus of claim 17 further comprising:
a second enclosure part, and
a second pliable support connecting the optical sub-assembly to the second enclosure part.

* * * * *